No. 627,259. Patented June 20, 1899.
A. HART & C. A. BRAMWELL.
EXPORT BUTTER BOX.
(Application filed Nov. 26, 1897.)
(No Model.)
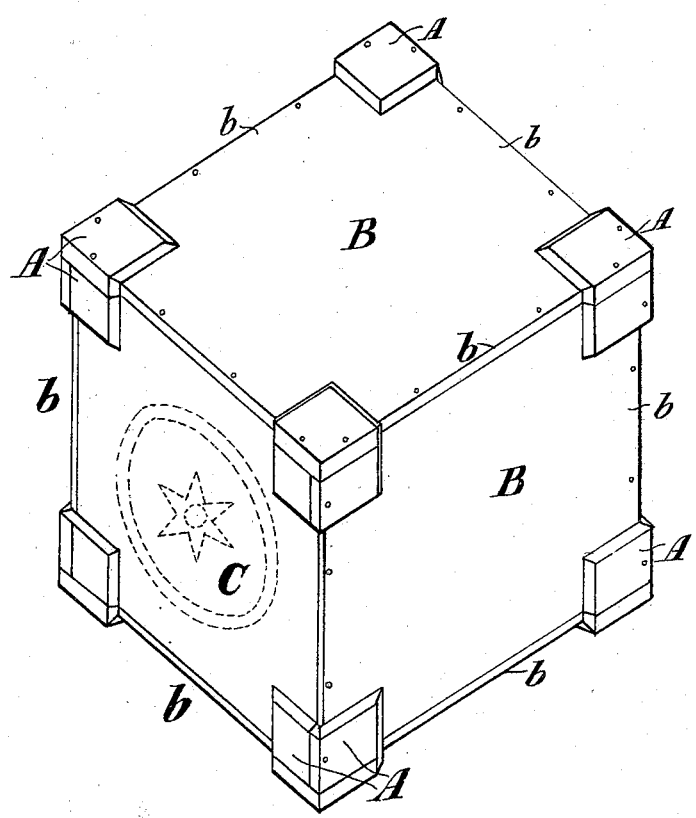
Witnesses:
E. B. Bolton
Inventors:
Alfred Hart
Charles Alfred Bramwell
By Richard
their Attorneys

UNITED STATES PATENT OFFICE.

ALFRED HART AND CHARLES ALFRED BRAMWELL, OF MELBOURNE, VICTORIA.

EXPORT BUTTER-BOX.

SPECIFICATION forming part of Letters Patent No. 627,259, dated June 20, 1899.

Application filed November 26, 1897. Serial No. 659,854. (No model.)

*To all whom it may concern:*

Be it known that we, ALFRED HART, poultry expert, and CHARLES ALFRED BRAMWELL, clerk, subjects of the Queen of Great Britain and Ireland, residing at the Freezing Works, City Markets, Flinders street, Melbourne, in the British Colony of Victoria, have invented a certain new and useful Improved Export Butter-Box, (for which we have obtained patents in Victoria, No. 12,916, dated February 26, 1896; in New South Wales, No. 6,424, dated March 2, 1896; in Tasmania, No. 1,578, dated March 9, 1896; in New Zealand, No. 8,340, dated March 11, 1896; in Great Britain, No. 7,386, dated April 7, 1896, and in South Australia, No. 3,429, dated October 9, 1896,) of which the following is a specification.

This invention has been designed for the purpose of so constructing butter-boxes as to allow a free circulation of air around each of them while they are packed together and being transported from place to place, and especially while they are in the refrigerating-chambers of steamships or vessels at sea.

We make our box, as usual, of wood, with each of its six sides solid and nailed or otherwise secured together, and it is on the outer surface of each side that we apply our invention in order to produce the foregoing result. Thus at each corner of each side we provide a raised surface or projection and which is preferably square, such surfaces standing one-quarter of an inch, or thereabout, above the remaining surface of the side, or, in other words, the face of each side is rabbeted or cut away, leaving the four corner-pieces raised above but integral therewith. By having the said projecting surfaces at the corners a plane surface is left in the recessed portion for the brands and which are thus protected from being soiled by the boxes rubbing one on the other.

The attached drawing shows a perspective view of our improved butter-box, A being the raised or projecting corner-surfaces, and B the rabbeted, sunk, or recessed surface of the sides.

The butter-box illustrated in the drawing is made and nailed together as shown, and we wish it to be clearly understood that each of the six sides of the box—*i. e.*, the sides, top and bottom, and the ends—has the four integral raised corner-surfaces, as herein described, and that between said raised corner-surfaces, at the edges of each side, as at $b$, a clear way is left which is flush with the sunk surface B.

The device marked C (shown in dotted lines on end of box) is simply to represent the butter-factory brand and which can be stamped on the sunk central surface of either one of the sides.

Our improved box, as herein described, and shown in the drawing, will leave a clear way or channel for the circulation of air around all the sides of each box when they are packed closely together and without having to pack them in any particular manner.

Having now described our invention, what we claim as new, and desire to secure by Letters Patent, is—

An export butter-box having each of its six sides provided with integral corner projections, the remaining portions of each of said sides between said projections being plain and rabbeted or sunk below the level of the projections, substantially as described.

In witness whereof we have hereunto set our hands in presence of two witnesses.

ALFRED HART.
    CHARLES ALFRED BRAMWELL.

Witnesses:
  BEDLINGTON BODYCOMB,
  GEO. E. BODYCOMB.